United States Patent

Steer et al.

[11] Patent Number: 5,190,329
[45] Date of Patent: Mar. 2, 1993

[54] HAND ACTUATED LOAD LIFTING DEVICE

[76] Inventors: Carol V. Steer; Peter R. Steer, both of 6 Nancy Yaun Court, Worongary, Queensland 4213, Australia

[21] Appl. No.: 833,115

[22] Filed: Feb. 10, 1992

[30] Foreign Application Priority Data

Feb. 13, 1991 [AU] Australia .................. 71018/91

[51] Int. Cl.⁵ ........................ B65G 7/12; B66F 11/00
[52] U.S. Cl. ........................................ 294/15; 294/26
[58] Field of Search ...................... 294/11, 15-17, 294/19.1, 26, 27.1, 32, 34, 62, 167-169

[56] References Cited

U.S. PATENT DOCUMENTS

| 488,357 | 12/1892 | Hill | 294/26 |
|---------|---------|------|--------|
| 976,042 | 11/1910 | Carr | 294/15 |
| 2,150,503 | 3/1939 | Hawkins | 294/17 X |
| 2,527,847 | 10/1950 | Plitt | 294/34 |
| 2,551,097 | 5/1951 | Cole | 294/15 X |
| 2,665,162 | 1/1954 | Moore et al. | 294/16 |
| 3,642,251 | 2/1972 | Niederholtmeyer | 294/15 X |
| 4,103,812 | 8/1978 | Steiner | 294/34 X |
| 4,113,160 | 9/1978 | Spiers | 294/26 X |
| 4,252,357 | 2/1981 | Majors | 294/11 |
| 5,069,495 | 12/1991 | Mears | 294/26 X |

FOREIGN PATENT DOCUMENTS

| 319153 | 4/1919 | Fed. Rep. of Germany | 294/15 |
| 8883 | of 1896 | United Kingdom | 294/34 |
| 2155319 | 9/1985 | United Kingdom | 294/15 |

*Primary Examiner*—Johnny D. Cherry
*Attorney, Agent, or Firm*—Kimmel, Crowell & Weaver

[57] ABSTRACT

A manual lifting aid having an elongated member provided with a hook at one end for engaging the load, and a handle assembly slidable along the elongated member. The handle assembly includes a handle and a locking member which is moved into engagement with the elongated member to lock the handle assembly to the elongated member so that a lifting force can be applied by the aid.

10 Claims, 4 Drawing Sheets

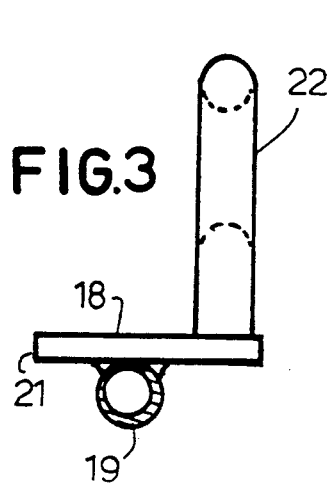
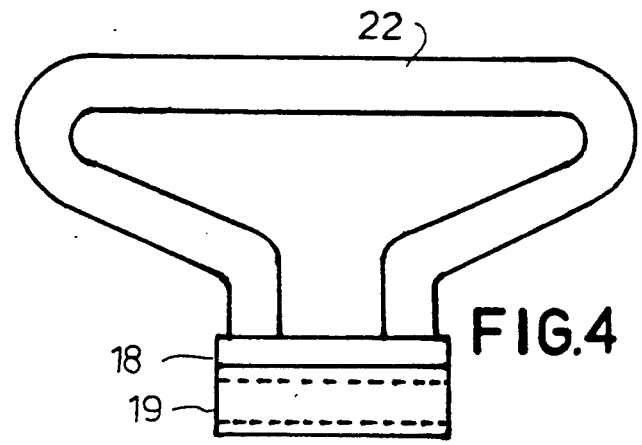
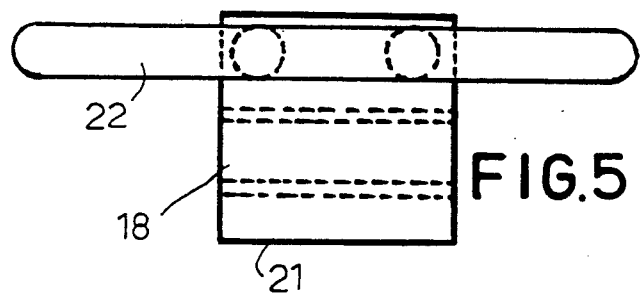
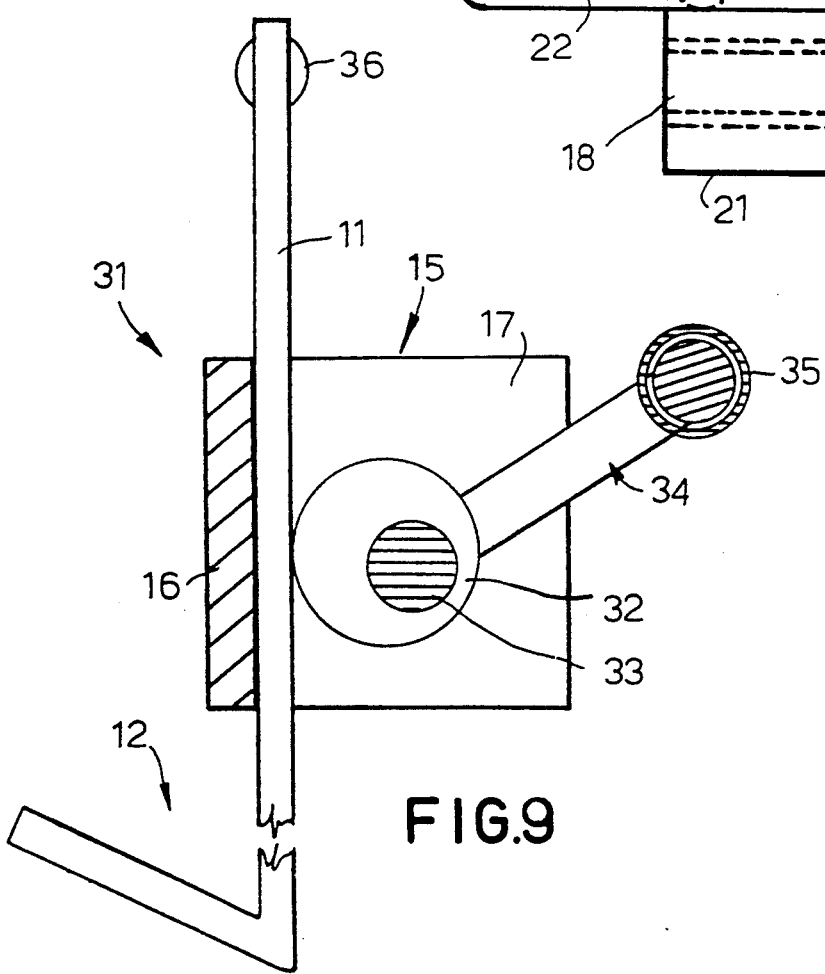

HAND ACTUATED LOAD LIFTING DEVICE

FIELD OF THE INVENTION

THIS INVENTION relates to a manual lifting aid which is particularly suited to lifting furniture or other objects which are normally difficult to lift unaided by hand.

BACKGROUND ART

Lifting of furniture and other heavy objects often creates difficulties for the lifter. Whilst various trolleys may be used to assist in lifting heavy objects, they are not suited to many situations and have limited maneuverability. Whilst it is known to use lifting straps formed for example of leather or other material, such straps are inappropriate in many situations and are usually required to be used where at least two persons are lifting a load. Furthermore, such straps can be subject to wear and breakage and so to avoid accidents they must be checked on a regular basis. Control over lifting provided by such straps is also not high.

SUMMARY OF THE INVENTION

The present invention aims to overcome or alleviate the above disadvantages by providing a manual lifting aid which may be used to assist in lifting a load and which serves as an efficient aid in lifting and transporting such a load. The present invention also aims to provide a device which is relatively simple to construct which has minimum maintenance requirements and which may be easily stored for usage as required. Other objects and advantages of the invention will become apparent hereunder.

With the above and other objects in view the present invention provides a manual lifting aid comprising an elongated member and load engaging means at one end of said member. A handle assembly is mounted on the elongated said member for guided movement therealong. The handle assembly includes a handle portion and a locking portion, the locking portion being actuable by the handle portion to lock said handle assembly in a desired position along the elongated member.

Preferably, the locking portion is pivotally mounted so as to be pivotally movable into engagement with the elongated member so as to prevent movement of said handle assembly relative to the elongated member at least in one direction. In one form, the locking portion comprises a locking tongue and the handle portion is fixed to the locking tongue for pivotal movement therewith. In an alternative form, the locking portion may comprise a cam to which the handle portion is fixed, the cam being rotatable into engagement with the elongated member.

Preferably, the handle assembly includes a guide slidable relatively along the elongated member, the tongue or cam being pivotally supported on the glide. Suitably, the guide comprises a channel sectioned member having a base flange or arm and a pair of opposite side flanges or arms between which the tongue or cam is pivotally supported, the tongue or cam in its locking position urging the elongated member against the base flange or arm.

The elongated member suitably includes a stop at its end opposite the load engaging means for preventing detachment of the handle assembly from said elongated member. Preferably, the load engaging means comprises a hook at one end of the elongated member and the elongated member comprises an elongated plate.

BRIEF DESCRIPTION OF THE DRAWINGS

In order that the invention may be more readily understood and put into practical effect, reference will now be made to the accompanying drawings which illustrate a preferred embodiment thereof and wherein:

FIGS. 3 to 5 illustrate in side elevational, front elevational and plan view, the handle and locking tongue of the handle assembly for the aid;

FIG. 9 illustrates an alternative handle locking assembly for the aid of the invention.

DETAILED DESCRIPTION OF THE EMBODIMENTS

Figure 1:
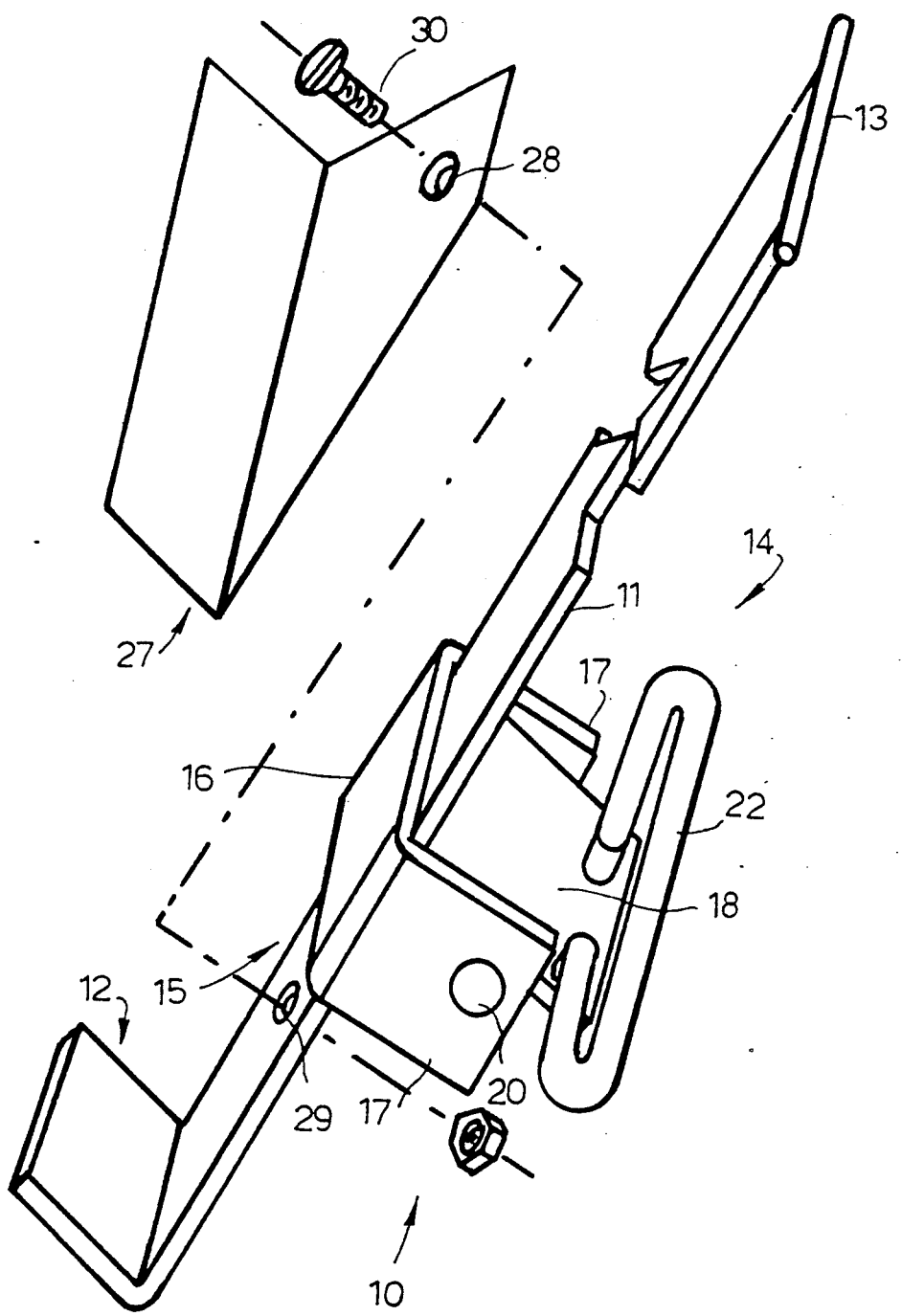
FIG. 1 is a perspective view of the lifting aid according to the present invention.
Figure 2:
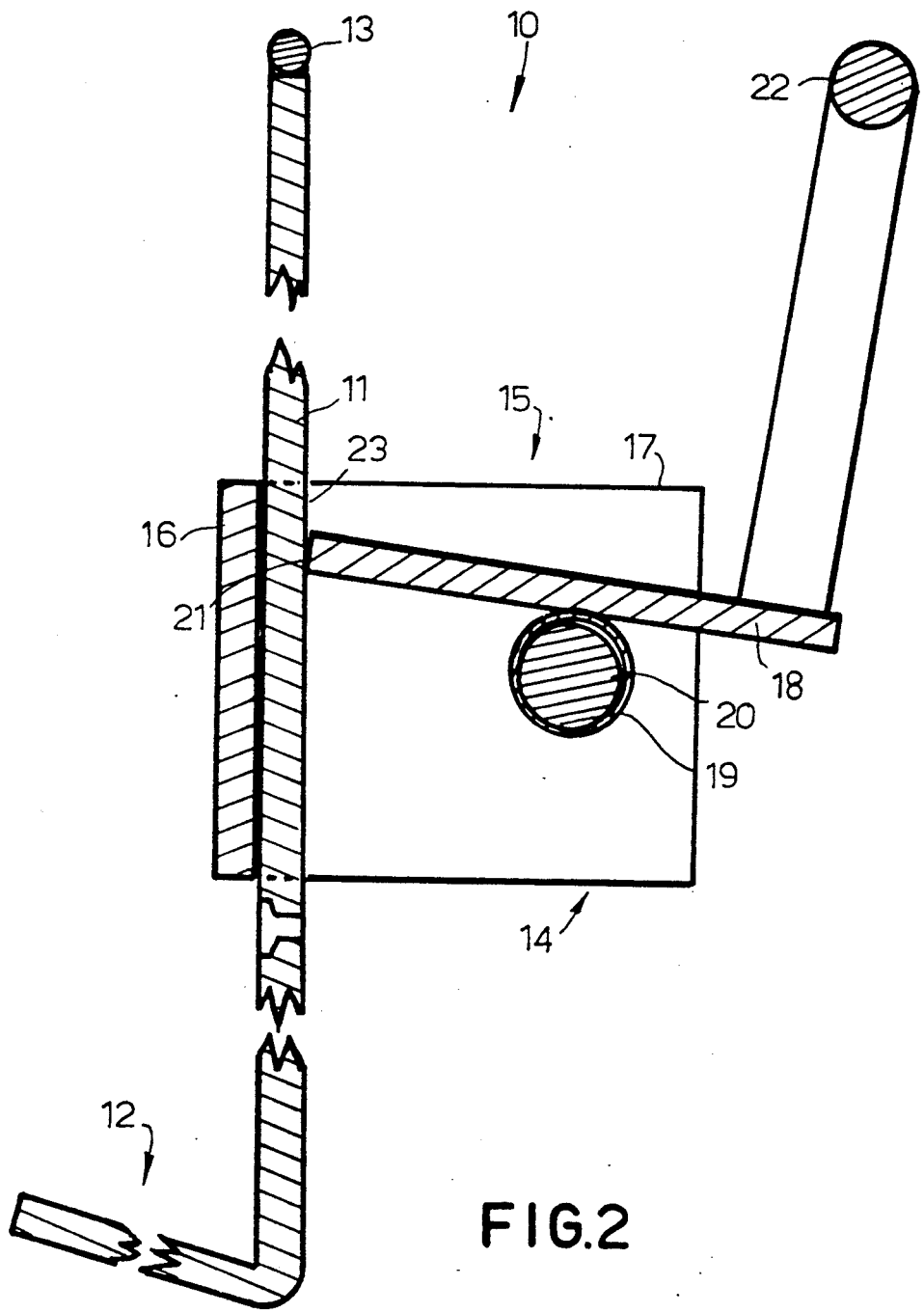
FIG. 2 is a longitudinal sectional view of the aid.

Referring to the drawings and firstly to FIGS. 1 and 2, there is illustrated a lifting aid 10 according to the present invention comprising an elongated member 11 formed of flat plate or similar strip-like material provided at one end with an outwardly turned portion 12 which forms a hook for engagement with a load to be lifted and which includes at its other end a stop 13 which has a purpose which hereafter will become apparent.

Mounted for slidable movement along the member 11 is a lockable handle assembly 14 which comprises a channel sectioned guide member 15 having a base flange 16 and a pair of opposite side flanges 17 located on opposite sides of the member 11 which is neatly received therebetween so that one of its faces is adjacent the base flange 16. A locking tongue 18 is mounted between the flanges 17 for pivotal movement towards and away from the elongated member 11. For this purpose the tongue 18, which suitably comprises a simple rectangular plate, is provided with a tubular member 19 on its underside which receives a pivot pin 20 which extends between and is supported by the opposite flanges 17. The tongue 18 also has a leading edge or end 21 which is adapted to engage the member 11.

Mounted to the tongue 18 in upstanding fashion for pivotal movement therewith is a gripping handle 22, the handle 22 being formed of rod-shaped material as shown more clearly in FIGS. 3 to 5 so as to allow easy gripping by the user. The length of the tongue 18 and its relationship to its pivotal axis is such that inward pivotal movement towards the elongated member 11 will cause the edge 21 to contact the adjacent face 23 of the member 11 in the manner shown in FIG. 2 whilst the opposite face of the member 11 is supported by the base flange 16 of the channel shaped member 15. The tongue 18, however, will not move beyond centre so that further force applied to the handle 22 in a direction away from the hooked portion 12 will increase the engagement of the tongue 18 with the member 11 and further force the member 11 into engagement with the flange 16 creating a wedging type action.

Figure 6:
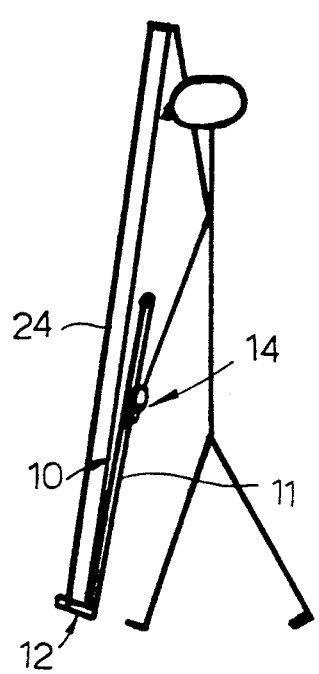
FIGS. 6 to 8 illustrate the manner in which the lifting aid according to the invention is employed.

In use and as shown in FIG. 6, the portion 12 of the elongated member 11 is located under the lower edge of say a planar type load 24 such as a sheet of material and the handle assembly 14 slid along the member 11 to a comfortable gripping position. The handle 22 is then gripped by the user causing the tongue 18 to pivot into engagement with the member 11 so as to lock the handle assembly 14 thereto. A lifting force applied to the handle 22 is then transmitted to the load 24 so as to enable lifting and carrying of the load 24. The weight of the load 24 is also transferred to the handle assembly 14, increasing the locking effect between the tongue 18, member 11 and base flange 16. If desired, a portion of the load 24 can be stabilized by the user's other hand.

Figure 7:
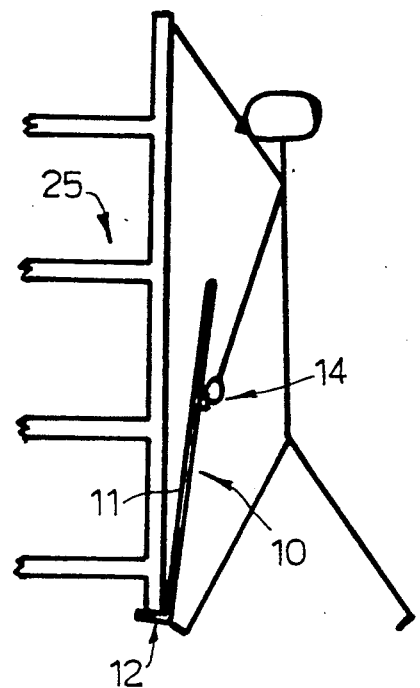
Figure 8:
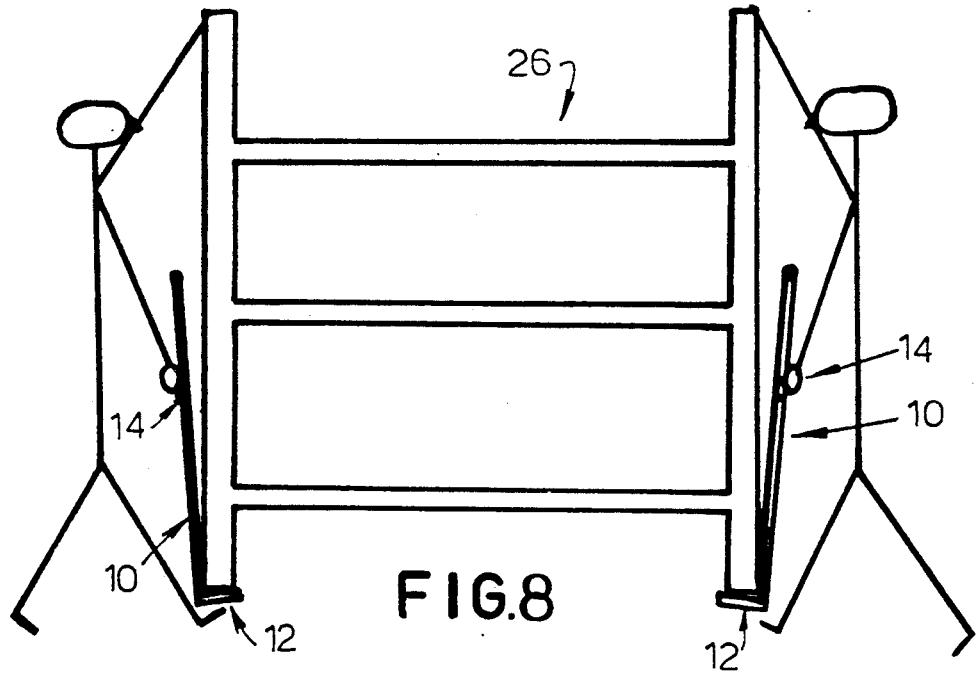

FIG. 7 illustrates an alternative load 25 being lifted by the device 10 of the invention whilst in FIG. 8 a load 26 is lifted by two persons, each using a lifting device 10 according to the invention on opposite sides of the load 26.

It will be apparent that the handle assembly 14 may be adjusted to infinite positions along the elongated member 11 and simply locked in position upon applying a force to the lifting handle 22 to urge the tongue 18 into engagement with the member 11. As the edge 21 of the tongue 18 engages one of the flat faces of the elongated member 11, maximum frictional gripping and locking effect are achieved. When the device 10 is released from a load, the stop 13 at the end of the member 11 will prevent detachment of the handle assembly 14 so that the device is suitable for use at any time.

For increased stability, a further jaw member 27 may be attached to the elongated member 11 as shown in FIG. 1. The jaw member 27 may take the form of a strip of material bent or formed to the configuration indicated so as to seat on the member 11 and be supported by the hook 12. It will be apparent, however, that the jaw member 27 is substantially broader than the elongated member 11 so that increased load distribution is provided. Preferably, the jaw member 27 is apertured at 28 for alignment with an aperture 29 in the elongated member 11 so as to enable it to be secured to the member 11 by means of a bolt 30.

Referring now to FIG. 9, there is illustrated a further embodiment of handle assembly 31 for use in the lifting aid and in which like components to the embodiment of FIGS. 1 to 5 have been given like numerals. The handle assembly 31 in this form comprises a U-shaped guide 15 having a base flange 16 and a pair of side flanges 17. Located between the side flanges 15 is an off centre cam 32 supported pivotally on an axle 33 which is mounted at each end to the opposite flanges 17. Fixed for movement with the cam 32 is a handle 34 which may be of similar form to the handle 22 of FIGS. 3 to 5 with the addition of a tubular gripping portion 35 rotatable relative to the handle 34. As before where the handle 34 is gripped and pivoted in the anti-clockwise direction, the cam 32 will rotate into engagement with the elongated member 11 so as to urge the member 11 against the base flange 16 and thereby lock the handle assembly 31 in a set position along the member 11. A load engaged by the hook 12 on the end of the elongated member 11 may then be lifted in the manner described above. Pivotal movement of the handle 34 and thus the cam 32 in the opposite direction will release the elongated member 11 permitting the handle assembly 31 to be slid along the elongated member 11 to any lifting position.

The handle assembly 31 is prevented from detachment from the member 11 by means of a stop 36 which may be simply a large rivet through the member 11.

The device of the invention is suitably formed of steel components which may be suitably treated to reduce corrosion. The device of the invention, however, may be formed of other materials. If desired, the face 23 of the elongated member 11 may be provided with a series of friction—increasing projections or ribs to improve the locking engagement between the locking tongue 18 and member 11.

To reduce damage to a load to be lifted, the outer face of the flange 16 may be provided with a protective pad of rubber or other padding material. Similarly, the portion 12 may be provided with a similar padding material.

Whilst the above has been given by way of illustrative embodiment of the invention, all such modifications and variations thereto as would be apparent to persons skilled in the art are deemed to fall within the broad scope and ambit of the invention as herein defined in the appended claims.

We claim:

1. A manual lifting aid comprising:
an elongated member;
load engagement means at one end of said member;
a handle assembly including a guide having a pair of opposite side arms and a base, said elongated member being slidingly disposed between said side arms and being adjacent said base;
locking means mounted between said arms for pivotal movement towards and away from said elongated member; and
a lifting handle fixed for movement with said locking means whereby a lifting force applied to said handle for lifting said load causes pivotal movement of said handle and thus pivotal movement of said locking means into engagement with said elongated member to lock said handle assembly relative to said member against movement in at least one direction along said elongated member to permit lifting of said load.

2. A manual lifting aid for use in manually lifting a load comprising:
an elongated load carrying member;
load engagement means at one end of said member; and
a handle assembly, said handle assembly including:
a guide mounted for slidable movement along said elongated member;
a locking portion pivotally mounted on said guide for movement towards and away from said elongated member; and
a handle fixed to said locking portion for movement therewith such that when said load is to be lifted and said handle is grasped and a lifting force applied thereto, said lifting force causes pivotal movement of said handle and thus pivotal movement of said locking portion into engagement with said elongated member to lock said handle assembly to said elongated member at any desired position therealong and permit lifting of said load.

3. An aid according to claim 2 wherein said elongated member includes a stop at its end opposite said load engagement means for preventing detachment of said handle assembly from said elongated member.

4. An aid according to claim 2 wherein said load engagement means comprises a hook at said one end of said elongated member.

5. An aid according to claim 4 wherein said elongated member comprises a elongated flat plate and wherein said plate is turned outwardly at said one end to form said hook.

6. An aid according to claim 2 wherein said load engagement means includes a hook member releasably secured to said elongated member.

7. An aid according to claim 2 wherein said handle is of loop form so as to allow gripping thereof and lifting thereby of a load engaged by said load engagement means.

8. A manual lifting aid according to claim 2, wherein said guide comprises a channel shaped member having a base flange and a pair of opposite side flanges to which said locking portion is pivotally supported, said elongated member being disposed between said side flanges and adjacent said base flange whereby, when said locking portion is pivoted by said handle, said locking portion engages said elongated member and urges said elongated member against said base flange.

9. A manual lifting aid according to claim 8, wherein said locking portion comprises a locking tongue mounted pivotally on an axle extending between said side flanges and wherein said handle is fixed to one side of said locking tongue.

10. A manual lifting aid for use in manually lifting a load comprising:
- an elongated load carrying member, said member having a pair of opposite faces;
- a load engagement hook at one end of said member; and
- a handle assembly, said handle assembly including:
- a channel shaped guide mounted for slidable movement along said elongated member, said guide having a pair of side arms and a base, one of said faces of said member being located adjacent said base;
- a locking tongue pivotally mounted to said guide between said side arms for movement towards and away from the other face of said elongated member; and
- a handle fixed to said locking tongue for movement therewith such that when said load is to be lifted, said handle is grasped and a lifting force applied thereto, said lifting force causing pivotal movement of said handle and thus movement of said locking tongue into engagement with said other face of said elongated member to urge said member against said base of said guide and lock said assembly to said elongated member at a desired position therealong to permit lifting of said load.

* * * * *